United States Patent Office 3,637,566
Patented Jan. 25, 1972

3,637,566
TERPOLYMER OF AN OLEFIN VINYL MONOMER AND A PARTIAL ESTER OF AN UNSATURATED ACID ANHYDRIDE WITH AN ETHOXYLATED ALKYL ALCOHOL
Oliver deS. Deex, Clayton, and William F. Fallwell, Jr., St. Louis, Mo., assignors to Monsanto Company, St. Louis, Mo.
No Drawing. Filed May 29, 1968, Ser. No. 732,887
Int. Cl. C08f *15/40, 29/48*
U.S. Cl. 260—29.6 TA    10 Claims

ABSTRACT OF THE DISCLOSURE

This invention relates to terpolymers of an olefinically unsaturated hydrocarbon, vinyl-type monomers and hydroxyl containing non-ionic dispersing agent partial esters of unsaturated polybasic carboxylic acid and their use as pigment binders in mineral coated paper. The non-ionic dispersing agent is represented by the formula $$H—(OCH_2CH_2)_n—OR$$

where $n$ is 5 to 60 and R is an alkyl group. A polymer of ethylene vinyl chloride and the ethoxylated tridecyl half ester of maleic acid is a representative terpolymer of this invention.

---

This invention relates to terpolymer compositions. More particularly, this invention provides new terpolymers which are useful as adhesives, as extrusion coatings, as gasketing material. In latex form, they are especially useful for the preparation of coating colors for paper and paperboard containing these terpolymers as an adhesive binder to improve the resistance of the mineral pigment coated paper to the pull of printing ink in the printing operation. They may also be applied as the only paper treating agent to improve the barrier properties and grease resistance of the paper or paperboard.

Briefly, this invention provides new terpolymers of (A) an olefinically unsaturated hydrocarbon having from 2 to 3 carbon atoms, (B) vinyl-type monomers, and (C) hydroxyl containing non-ionic dispersing agent partial esters of unsaturated polybasic carboxylic acid. This invention also provides a process for preparing such terpolymer compositions by reacting the three types of monomers by mass, suspension, precipitation or emulsion polymerization techniques at temperatures ranging from about —40° C. to about +150° C. at pressures of from about 100 to about 100,000 p.s.i. The particular conditions chosen being dependent upon the monomers used, the mode of operation used, the weight ratio of monomers desired, etc.

The terpolymers of this invention contain from about 2 to about 60 weight percent of the olefinically unsaturated hydrocarbon monomer (A), from about 40 to about 98 weight percent of the vinyl-type monomer (B) and from about 0.1 to about 40 weight percent of the hydroxyl-containing non-ionic dispersing agent partial ester (C). This invention provides a means for manufacturing vinyl-type interpolymers of at least three monomer materials while providing for "built in" dispersancy required for making fine quality, small particle size terpolymers which features are desirable for use of the terpolymers in the manufacture of latex paints and for use in conventional paper coating equipment for application to cellulosic substrates.

The olefinically unsaturated hydrocarbon monomers (A) which may be used to prepare the terpolymers of this invention include ethylene, propylene and mixtures thereof.

The vinyl type compounds (B) which may be used are of the formula

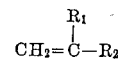

wherein $R_1$ is hydrogen, methyl or halogen and $R_2$ is hydrogen or a carbonyl type residue such as —COOR$_3$ or —OCOR$_4$ where $R_3$ is an alkyl radical having from 1 to about 12 carbon atoms, preferably from 1 to 4 carbon atoms, and $R_4$ is an alkyl radical having from 1 to about 4 carbon atoms, —CN, phenyl, —Cl and —Br.

The partial ester comonomer (C) may be described as the partial ester of a (1) alpha,beta-olefinically unsaturated polycarboxylic acid or anhydride thereof having from 4 to about 10 carbon atoms, and (2) a hydroxyl-containing non-ionic dispersing agent. Preferably the partial ester comonomer is obtained by reacting a polymerizable polybasic carboxylic acid anhydride having a formula

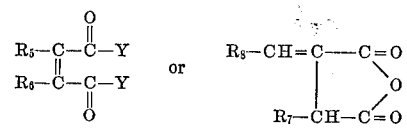

where each of $R_5$, $R_6$ and $R_7$ is either hydrogen or lower alkyl having from 1 to 2 carbon atoms, and $R_8$ is either hydrogen or a carboxyl group and each Y denotes a carboxyl hydroxy group, or taken together denote an anhydride —O— ring closing member with a hydroxyl terminated non-ionic dispersing agent which is generally a composition mixture conforming in general to the formula

wherein $R_9$ is any hydrophobic group, e.g., an alkyl having from 6 to about 30 carbon atoms or alkyl substituted phenyl radicals having a total from about eight through about 25 carbon atoms in the alkyl substituents on the phenyl ring with at least one alkyl group having at least six carbon atoms, and $n$ is an average number of from about 5 to about 60 or more denoting the average number of ethyleneoxy groups in the non-ionic dispersing agent composition used to prepare the partial ester comonomer.

Examples of the olefinically unsaturated hydrocarbon monomers (A) are ethylene, propylene and mixtures thereof.

Both suspension and emulsion polymerization involve the use of a non-solvent for the one or more monomers and the polymer but in the suspension technique the particles of polymer are comparatively large, while in the emulsion procedure the particles are much smaller and the final product is a stable latex. A suitable method for effecting suspension is to employ water and a small amount of added suspending agent, such as a vinyl acetate-maleic anhydride or acid copolymer or certain phosphates, with a lauroyl peroxide or similar water insoluble initiator and a limited amount of an emulsifier such as glyceryl monostearate. Suitable emulsion polymerization techniques generally involve the terpolymerization of the olefin hydrocarbon, the vinyl type monomer, and the partial ester in an aqueous medium in the presence or absence of additional anionic or nonionic emulsifier having an HLB value (hydrophilic-lipophilic balance) of from about 10 to 17 is used. The catalyst is a free radical system, preferably by a redox system consisting of an oxidizing agent, reducing agent and a multivalent metal compound. If an anionic emulsifier is used, an alkaline buffer is also preferably included. Satisfactory oxidizing agents are hydrogen peroxide, inorganic persulfate, organic peroxide or hydroperoxides and alkali metal and ammonium sulfites, thiosulfates, sulfoxylates, bisulfites and hydrosulfites. A preferred multivalent metal compound is exemplified by ferric ethylenediaminetetraacetate (Fe·EDTA)

Suitable ranges of oxidizing agent, reducing agent, multivalent metal compound, and buffer and methods for adding the various emulsifiers, redox catalyst components, as well as the monomers to the reactor to make emulsion polymers are described in copending applications Ser. Nos. 422,004 and 422,030, filed Dec. 29, 1964 and now abandoned. Such ingredients and methods may similarly be used in making the terpolymers of this invention.

When terpolymers are being prepared from vinyl type monomers (B) that do not need to be pressurized, e.g., in the polymerization of vinyl acetate containing terpolymers a preferred method of combining the various components of the polymerization mixture is to first combine a relatively higher proportion of the half-ester with the vinyl and the olefin hydrocarbon monomers, polymerization catalyst or initiator, and water in the reaction vessel and heat and stir the mixture to form polymer "seed" particles. This mixture can be termed the "charge" mixture. To this "charge" mixture of polymer "seed" in water, an aqueous neutralized solution of the partial ester, the vinyl monomer, the olefin hydrocarbon, the catalyst, and additional water are metered into the stirred or agitated reaction mixture, preferably so that the addition of all of the components will be completed at about the same time, while maintaining the temperature high enough to promote reaction. When the addition of the components is completed, heating is continued until the content of the vinyl monomer is essentially depleted, say, to below about 1%, preferably ½% or less. The terpolymer dispersion or latex thus obtained may be used as such. Preferably, however, it is strained through a 100 to 200 mesh screen to remove any coagulum which may have formed, which should be a very small amount by weight based on the weight of the terpolymer produced in the given batch. Generally, the amount of such coagulum should amount to no more than about ½% of the emulsion terpolymer weight and is generally less than 0.1%.

EXAMPLE 1

This example illustrates how terpolymers within the scope of this invention may be prepared. For this example the monomers selected were ethylene, vinyl chloride, and a commercially available ethoxylated tridecyl alcohol mixed half-ester of maleic acid. The number of repeating ethoxy groups in the alcohol ester moiety was between 9 to 10.

An evacuated, clean dry 3850 ml. autoclave with a rotary stirrer was charged with 1750 ml. of an aqueous solution containing 18.0 g. of sodium bicarbonate, 12.0 g. of potassium persulfate, 10 ml. of ammonium hydroxide, 0.866 g. of ferric ammonium

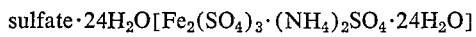

and 1.37 g. of tetrasodium ethylenediaminetetraacetate. Then 450 g. of oxygen-free ethylene and 150 g. of uninhibited vinyl chloride were added. The vessel was sealed and the stirrer in the autoclave was started and the temperature was brought to 30° C. The pressure was 850 p.s.i. When equilibrium was reached the polymerization reaction was started by the addition of 0.7 ml. of an aqueous solution containing 150 g. of sodium formaldehyde sulfoxylate and 100 ml. of 15 N ammonium hydroxide per liter of solution. Additional 0.7 ml. portions of the sulfoxylate-ammonium hydroxide solution were added every 7.5 minutes to maintain the reaction. Fifteen minutes after the start of the reaction, an aqueous 60% solution of the above ethoxylated tridecyl half-ester of maleic acid was added continuously at the rate of 0.7 ml. every 1.5 minutes. Constant pressure was maintained in the reaction vessel by the addition of vinyl chloride as required. At the end of 5.25 hours addition of the ethoxylated tridecyl ester of maleic acid was discontinued. A total of 150 ml. of the solution had been added. The reaction was completed at the end of 5.5 hours and the addition of the sulfoxylate was stopped and the stirrer turned off. After allowing one-half hour for the unreacted monomer to separate from the terpolymer latex, the monomers were vented from the top of the autoclave and the latex was drained out the bottom. The ethylene/vinyl chloride/ethoxylated tridecyl half maleate ester terpolymer latex recovered weighed 3300 g., had a total solids content of 45%, a pH of 8.0 and an average weight particle size (by light scattering) of about 2000 A. The ethoxylated tridecyl half-maleate ester, which was present in both the combined (terpolymer) form and as an emulsifier, was present at a level of 6% based on total polymer. Infrared spectrographic analysis indicated that about half of the ethoxylated tridecyl half maleate ester is in the combined state and chlorine analysis showed the terpolymer composition to be about 22% ethylene, 75% vinyl chloride and 3% ethoxylated tridecyl half maleate ester, by weight.

The terpolymer dispersion or latex in water is preferably used soon after it is prepared. For any extended shipping or storage periods, however, the terpolymer dispersion may be stabilized by adding to the aqueous terpolymer dispersion any well known polymer stabilization agent such as polyvinyl alcohol, hydroxyethyl cellulose, and anionic emulsifying agents such as higher fatty alcohol sulfates, e.g., sodium lauryl sulfate, the alkylarylsulfonates such as alkali metal salts of the alkylarysulfonates such as sodium octylphenylsulfonate, potassium dinonylphenylsulfonate, and sodium dioctyl sulfosuccinates, etc.

The terpolymer dispersion or latex may be applied directly to one or both sides of paper surfaces by known application methods to impart improved barrier properties to the treated paper but is particularly useful as a pigment binder and as such is mixed with the pigment prior to application to the paper. The pigment or pigments are preferably mixed and dispersed in a small amount of water before mixing with the terpolymer dispersion. When clay is used as a part of the pigment, and in preferred applications it forms a predominant proportion if not the only pigment, the clay dispersion is adjusted to a basic pH to obtain the optimum dispersion of the clay.

Pigments which may be employed include clays, especially the kaolin type, calcium carbonate, blanc fixe, talc, titanium dioxide, color lakes and toners, ochre, carbon black, graphite, aluminum powder or flakes, chrome yellow, molybdate orange, toluidone red, copper phthalocyanines, such as the "Monastral" blue and green lakes. The term "mineral" as used herein is intended to define all such types of pigmentary matter whether of strictly mineral character, synthesized chemical pigments, or partly of organic material.

The amount of the adhesive or binder in a coating composition for paper applications generally runs from about 5 parts to about 40 parts by weight of the binder for every 100 parts of the pigment, and is preferably from 10% to 25% by weight thereof. The terpolymer dispersions of this invention may constitute the entire binder of the coating composition. The terpolymers may also be combined with other binders such as synthetic resins, starches and proteinaceous materials to improve the effectiveness thereof. Synthetic resins useful as binders include styrene butadiene, polyvinyl acetate, polyvinyl alcohol, acrylic derivatives such as polyethyl acrylate and copolymers such as the copolymer of methyl methacrylate and ethyl acrylate, copolymer of methyl methacrylate and 2-ethylhexyl acrylate and the like. Such known types of starches and starch derivatives referred to herein generally as starch products are, for example, dextrins, hydroxyethylated starches, British gums, etc.

Proteinaceous materials include materials such as casein, soybean extract, etc. referred to herein as proteins. The proportion of the terpolymer latex to the synthetic resin, carbohydrate or protein in the binder composition will depend upon the degree of improvement in brightness, gloss ink holdout, coating gloss, etc. desired, but may range from 99:1 to 5:95 parts by weight of the terpolymer to the other binder material.

After combining the pigment and the terpolymer dispersion containing binder, the resulting composition can be applied to the paper, paperboard, or paper product at a total solids concentration of at least about 40% solids and preferably 50% to 70% by any suitable equipment such as immersion roll or doctor systems, gravure roller system, brush coater, blade coater or spray coater. It may be applied to the paper after drying and/or conditioning in an "off-machine" secondary operation converter or it may be applied during the drying operation on the paper making machine where it has undergone only partial drying.

After the coating operation the coated sheet is dried and may then be calendered, and subsequently printed upon. The drying may be the usual type provided in which air is about 230° F. to 260° F. (110°–130° C.) is directed against the paper for thirty to sixty seconds. The paper and coating may reach a temperature of about 180° F. (ca. 85° C.) during the drying operation. Printing may be effected by the conventional inks of precipitation type or heat setting type including those based on drying oils. The coated products of this invention are receptive to single color inks and multi-color inks of graded viscosity and are able to withstand the pull of such inks. The coated sheet may be overcoated, after printing with wax, lacquer, varnish or other compositions.

EXAMPLE 2

A standard pigment composition consisting of 90% by weight of clay (kaolin) and 10% of titanium dioxide was dispersed in water to a 70% total solids content using a high mechanical shear apparatus with the aid of one-quarter percent by weight based on the weight of the dry pigment of a tetrasodium pyrophosphate dispersing agent. To this dispersion there was added the terpolymer dispersion or latex, the solids content of which ranged from about 30% to 50% polymer solids depending upon the terpolymer used in the ratio of about 25 parts by weight of polymer solids to 100 parts by weight of the pigment solids.

In the I.G.T. test a tack graded ink is applied uniformly to a standard diameter wheel. A strip of paper or paper board containing the test coating thereon is fastened to a spring loaded cylindrical segment of known diameter. The ink-laden wheel is placed against one end of the strip of paper or paper board at a known constant pressure. The cylinder spring is released and as the cylinder passes through a given arc the tacky ink is applied to the strip at velocity increasing from 0 to about 630 ft. per minute. If the coating fails ("picks") a break in the coating will be apparent at some point of the strip. The first point of such consistent failure is measured and reported as the velocity (ft./min.) and ink tack number withstood by the coating before failure. This test is run on mineral pigment coated paper with inks of increasing tack numerically designated in ascending increments until failure occurs.

This test procedure was used on a mineral pigment coated label paper as described above using the ethylene/vinyl chloride/ethoxylated tridecyl half maleate terpolymer latex, produced as described in Example 1. A paperboard of Fourdrinier bleached Sulfate Board stock was coated with the mineral pigment coating composition at 50% total solids using a No. 12 wire wound rod. About 3 pounds of the coating composition per 1000 sq. ft. of the board was thus applied to one surface. The coated board was dried in an open infra-red oven at 125° C. 1 min. and super calendered at 55° C. and pressure of 2,500 lbs./lineal inch. The coated board had a smooth surface highly receptive to ink and an I.G.T. pick resistance as follows.

| Ink No.: | Velocity at failure (ft./min.) |
|---|---|
| 2 | 480 |
| 3 | 230 |
| 4 | 250 |

The paperboard coated with a mineral pigment composition as described in Example 2 exhibited a good coating gloss and brightness, an excellent gloss ink holdout and a high degree of wet rub resistance.

While this invention has been described with respect to certain embodiments, it is not so limited and it is to be understood that variations and modifications thereof may be made without departing from the spirit or scope of this invention.

What is claimed is:

1. A terpolymer of (A) about 2 to about 60 weight percent of an olefinic hydrocarbon having from 2 to 3 carbon atoms, (B) about 40 to about 98 weight percent of a compound of the formula

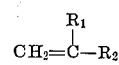

and (C) about 0.1 to about 40 weight percent of a partial ester derived from (1) an unsaturated polybasic carboxylic acid anhydride having from 4 to about 10 carbon atoms and (2) a hydroxyl containing non-ionic dispersing agent, said terpolymer being further defined in that in component (B) $R_1$ is selected from the group consisting of hydrogen, methyl or halogen, $R_2$ is selected from the group consisting of hydrogen or a carbonyl type residue selected from —$COOR_3$ or —$OCOR_4$ where $R_3$ is an alkyl radical having from 1 to about 12 carbon atoms and $R_4$ is an alkyl group having from 1 to about 4 carbon atoms, —CN, phenyl, —Cl and Br; and in the partial ester (C) the unsaturated acid anhydride has a formula selected from the group consisting of

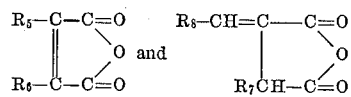

wherein each of $R_5$, $R_6$ and $R_7$ is selected from the group consisting of hydrogen and lower alkyl having from 1 to 2 carbon atoms, and $R_8$ is selected from the group consisting of hydrogen and the carboxyl group and the non-ionic dispersing agent has the formula

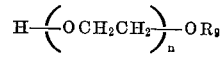

wherein $R_9$ is selected from the group consisting of alkyl radicals having from 6 to about 30 carbon atoms and alkyl substituted phenyl radicals having a total of from 8 to about 25 carbon atoms in the alkyl substituents on the phenyl ring with at least one such alkyl group having at least 6 carbon atoms, and $n$ is an average number of from about 5 to about 60.

2. A terpolymer as described in claim 1 wherein the weight content of monomers (A), (B) and (C) varies from about 2 to 60 weight percent of (A), 40 to 98 weight percent of (B) and about 0.1 to 20 weight percent of (C).

3. A terpolymer as described in claim 2 wherein the olefinic hydrocarbon monomer (A) is ethylene, the monomer (B) is vinyl chloride and in the partial ester monomer (C) the unsaturated dibasic carboxylic acid anhydride (1) is maleic anhydride, and the hydroxyl containing non-ionic dispersing agent (2) is one wherein $R_9$ is alkyl radical having from 6 to about 30 carbon atoms, and $n$ is an average number of from about 5 to 15.

4. A terpolymer as described in claim 3 wherein the monomer (A) is ethylene, monomer (B) is vinyl chloride and monomer (C) is the ethoxylated tridecyl maleate half-ester having between about 9 and 10 ethoxy groups in said ester moiety.

5. A process for preparing a dispersed terpolymer in an aqueous medium which comprises reacting (A) about 2 to about 60 weight percent of an olefinic hydrocarbon having from 2 to about 3 carbon atoms, (B) about 40 to about 98 weight percent of a compound of the formula

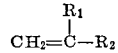

wherein $R_1$ is selected from the group consisting of hydrogen, methyl and halogen and $R_2$ is selected from the group consisting of hydrogen and a carbonyl type residue selected from —COOR$_3$ and —OCOR$_4$ where $R_3$ is an alkyl group having from 1 to about 12 carbon atoms and $R_4$ is an alkyl group having from 1 to about 4 carbon atoms, —CN, -phenyl, —Cl and —Br, and (C) about 0.1 to about 40 weight percent of a partial ester of an unsaturated carboxylic acid anhydride having a formula selected from the group consisting of

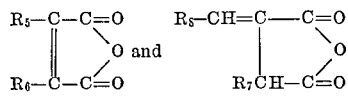

wherein $R_5$, $R_6$ and $R_8$ are each selected from the group consisting of hydrogen and alkyl radicals having from 1 to 2 carbon atoms, and $R_8$ is selected from the group consisting of hydrogen and a carboxyl group, with about an equimolar proportion of a hydroxyl group containing non-ionic dispersing agent of the formula

wherein $R_9$ is selected from the group consisting of alkyl radicals having from 6 to about 30 carbon atoms and alkyl substituted phenyl radicals having a total of from about 8 to about 25 carbon atoms in the alkyl substituents, and having at least 6 carbon atoms in at least one alkyl substituent, and $n$ is an average number of from about 5 to about 60.

6. A process as described in claim 5 wherein the reaction between monomers A, B and C is conducted at a temperature of from about 0° to about 100° C., and at a pressure of from about 200 p.s.i. to about 50,000 p.s.i.g.

7. A process as described in claim 6 wherein monomer A is ethylene, monomer B is vinyl chloride and monomer C is a partial ester of polybasic unsaturated carboxylic acid anhydride containing $R_5$ and $R_6$ and $R_5$ and $R_6$ are each hydrogen, and in the alcohol moiety of said partial ester $R_9$ is an alkyl group having from 6 to about 30 carbon atoms, and $n$ is an average number of from about 5 to 15.

8. A process as described in claim 7 wherein monomer A is ethylene, monomer B is vinyl chloride, and monomer C is an ethoxylated tridecyl half ester of maleic acid wherein there are about 9 to 10 ethoxy groups in said alcohol ester moiety.

9. A process as described in claim 8 wherein the ethylene, vinyl chloride, and the ethoxylated tridecyl maleate half ester are combined in such proportions to obtain a terpolymer having from about 2 to 60 weight percent of ethylene, from about 40 to 98 weight percent of vinyl chloride, and from about 0.1 to 20 weight percent of the ethoxylated tridecyl maleate half ester.

10. A terpolymer as described in claim 3 wherein the monomer (A) is ethylene, monomer (B) is vinyl chloride and monomer (C) p-dodecylphenylnonaethoxyethyl hydrogen maleate.

References Cited

UNITED STATES PATENTS

| | | | |
|---|---|---|---|
| 2,342,400 | 2/1944 | Hopff et al. | 260—29.6 EWX |
| 2,703,794 | 3/1955 | Roedel | 260—29.6 TA UX |
| 3,207,718 | 9/1965 | Zimmerman | 260—29.6 RW UX |

FOREIGN PATENTS

| | | | |
|---|---|---|---|
| 989,678 | 4/1965 | Great Britain | 260—29.6 TH |

JULIUS FROME, Primary Examiner

J. B. LOWE, Assistant Examiner

U.S. Cl. X.R.

260—29.6 RW, 78.5 R

UNITED STATES PATENT OFFICE
CERTIFICATE OF CORRECTION

Patent No. 3,637,566    Dated January 25, 1972

Inventor(s) Oliver Deex and William F. Fallwell, Jr.

It is certified that error appears in the above-identified patent and that said Letters Patent are hereby corrected as shown below:

In Column 7, line 24, change "$R_8$" to --- $R_7$ ---.

Signed and sealed this 15th day of August 1972.

SEAL)
ttest:

DWARD M. FLETCHER, JR.
ttesting Officer

ROBERT GOTTSCHALK
Commissioner of Patents